United States Patent

McCluskey, Jr.

[11] 3,863,250
[45] Jan. 28, 1975

[54] GLASS BREAKAGE DETECTOR

[76] Inventor: Arthur McCluskey, Jr., 41187 Alline St., Fremont, Calif. 94538

[22] Filed: Jan. 30, 1973

[21] Appl. No.: 328,096

[52] U.S. Cl................... 340/274, 340/261, 310/8.1
[51] Int. Cl...................... G08b 13/02, G08b 13/04
[58] Field of Search .......... 340/274, 273, 276, 261; 310/8.3, 8.1, 8.5

[56] References Cited
UNITED STATES PATENTS

| | | | |
|---|---|---|---|
| 3,441,754 | 4/1969 | Heny | 310/8.5 X |
| 3,521,266 | 7/1970 | Hall | 340/261 |
| 3,527,967 | 9/1970 | Dyer | 310/8.2 |
| 3,534,356 | 10/1970 | Bagno | 340/276 X |
| 3,582,692 | 6/1971 | Palini | 340/274 X |
| 3,582,839 | 6/1971 | Pim | 310/8.3 X |
| 3,604,958 | 9/1971 | Palini | 340/274 X |
| 3,614,483 | 10/1971 | Berlincourt | 310/8.5 X |
| 3,631,271 | 12/1971 | Shimada | 310/8.5 X |
| 3,665,259 | 5/1972 | Brailsford | 340/261 X |
| 3,733,598 | 5/1973 | Kato | 340/261 |
| 3,750,127 | 7/1973 | Ayers | 340/261 |
| 3,760,402 | 9/1973 | Magerle | 340/261 X |

Primary Examiner—Glen R. Swann, III
Attorney, Agent, or Firm—Schapp and Hatch

[57] ABSTRACT

An alarm for sensing glass breakage having a solid state electronic shock sensor positionable on a sheet of glass and connected through a variable resistance circuit and a threshold detector SCR to a signaling device to detect the breakage of glass. The shock sensor is formed of a number of layers of materials including a piezoelectric material bonded by an electrically conductive epoxy to an electrically conductive sheet of material, such as copper, which in turn is positioned against a layer of epoxy glass, which is joined by a layer of catalyzed epoxy to a plastic case having a layer of adhesive polyurethane formed on the outside. The plastic case is mountable on a sheet of glass and when the glass is broken, the shock waves indicating breakage are transmitted through the layers of materials, which function to attenuate the signals outside the band of shock waves, to the piezoelectric material which generates an electrical signal which is transmitted via the variable resistor circuit to the threshold detector SCR to the signaling device to signal breakage of the glass.

5 Claims, 2 Drawing Figures

PATENTED JAN 28 1975          3,863,250

GLASS BREAKAGE DETECTOR

BACKGROUND OF THE INVENTION

The present invention relates to an alarm for sensing glass breakage and more particularly to a solid state electronic shock sensor mountable on the glass to detect shock waves due to glass breakage.

Typical prior art alarms for detecting glass breakage are constructed of materials that do not properly attenuate signals out of the band of shock waves. As a result, these devices have a tendency to generate false alarms. Other prior art devices are not sufficiently sensitive to shock waves. All of these devices are further susceptible to corrosion due to moisture and other environmental elements. Moreover, they typically require excessive maintenace.

SUMMARY OF THE INVENTION

The general purpose of the invention is to provide an alarm having a shock sensor for sensing glass breakage or hard raps on glass capable of breaking it which avoids the above described disadvantages and accurately senses breakage of the glass. To attain this, the shock sensor is formed of a material such as a piezoelectric material which generates an electric signal in response to shock waves. The piezoelectric material is positioned against a number of layers of materials which attenuate signals out of the band of shock waves to thereby reduce false alarms. The shock sensor is enclosed in a plastic case to protect it from moisture and other elements of the environment and thereby reduce maintenance expense.

According to the present invention, the piezoelectric material is bonded by an electrically conductive epoxy to an electrically conducive sheet of material such as copper. The copper is in turn positioned against a layer of epoxy glass which is bonded to the inside of a plastic case by a catalyzed epoxy binder. The plastic case is preferably formed of glass filled diallpthyllate and is mounted on a pane of glass by an adhesive layer of polyurethane foam, preferably about 1/16th of an inch thick bonded to the outside of the plastic case.

The polyurethane foam transmits signals in the spectrum of shock waves but attenuates signals outside of that spectrum. The shock waves are transmitted through the plastic case which further attenuates signals out of the range of shock waves through the catalyzed epoxy binder to the laminate of epoxy glass. The catalyzed epoxy binder as well as the laminate of epoxy glass further attenuates signals out of the range of shock waves. Shock waves are transmitted through the copper plating and the conductive epoxy binder to the ceramic piezoelectric material. An electrical signal is generated by the deformation of the piezoelectric material due to shock waves. This signal is transmitted through a variable resistor circuit to control an SCR. The variable resistor circuit is adjusted so that the voltage applied to the SCR exceeds its threshold level only in response to shock waves. The SCR is connected in series with a utilization device such as a solenoid of an alarm relay. The electrical circuit from the piezoelectric material is completed by connecting a return lead to the copper plating.

When the sensor detects shock signals from the glass on which it is mounted indicating breakage or a hard rap thereon, the distortion of the piezoelectric material generates a voltage which is applied to the variable resistor circuit to cause the SCR to be conductive. The conductivity of the SCR energizes the solenoid which in turn activates any standard utilization device for signaling an alarm.

Accordingly, an object of the present invention is to provide alarm means for sensing glass breakage or hard raps thereon.

Another object of the present invention is to provide a solid state electronic shock sensor mountable on a sheet of glass for sensing shock waves and attenuating signals outside the band frequency of the shock waves.

A further object of the present invention is to provide shock sensor means having a piezoelectric device for generating an electrical signal in response to shock waves.

Still another object of the present invention is to provide shock sensor means for detecting glass breakage and formed of materials for attenuating signals out of the range of shock waves to avoid false alarms.

Yet another object which is to provide an electrical circuit responsive to shock waves and glass for generating an alarm signal.

Other objects, advantages and novel features of the present invention will become apparent from the following detailed description of the invention, when considered in conjunction with the accompanying drawings.

BRIEF DESCRIPTION OF THE DRAWINGS

The preferred form of present invention is illustrated in the accompanying drawings, forming part of the specification, in which.

DESCRIPTION OF THE PREFERRED EMBODIMENT

Figure 1:
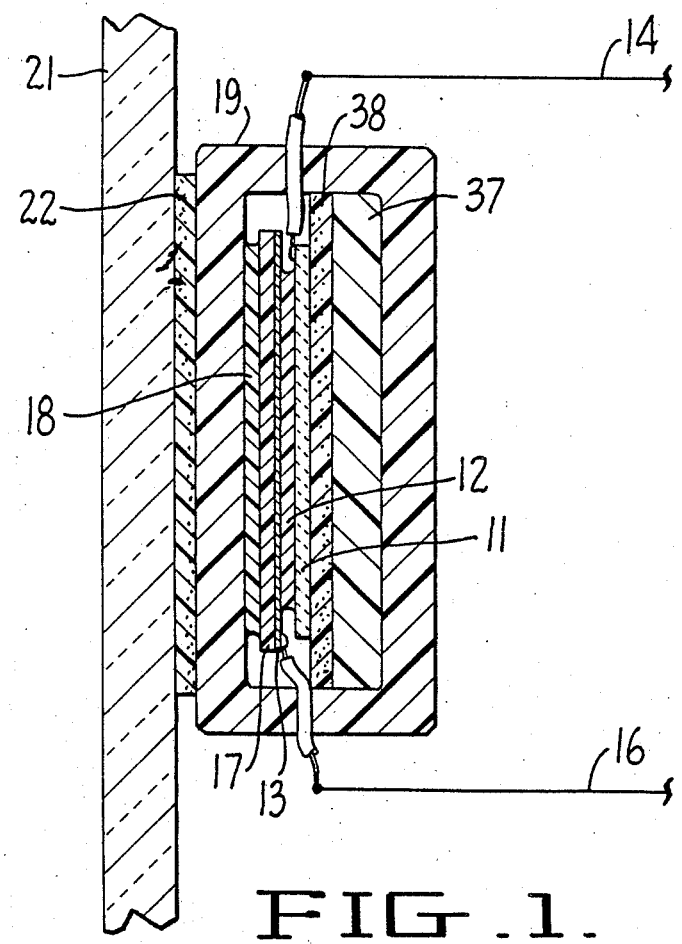
FIG. 1 is a detailed drawing of the shock sensor of the present invention.

Referring to FIG. 1, there is shown a ceramic piezoelectric material 11 which generates an electrical signal in response to shock waves from shattering glass. The piezoelectric material is bonded by a layer of electrically conductive epoxy 12 which is allowed to cure under pressure to a sheet of conductive material 13, formed preferably of copper. The output signal from the piezoelectric material is transmitted through a lead wire 14 and the return signal to the conductive copper plate is transmitted through lead wire 16.

The conductive plate is positioned against a laminate of epoxy glass 17, which is commonly available. The laminate of epoxy glass is preferably between 1/32 to 1/64 of an inch thick, and is capable of filtering signals out of the range of shock waves. It is particularly adaptable to the present invention in view of the change in sensitivity of the laminate with change in thickness. The laminate is bonded by a layer of catalyzed epoxy 18 to the inside of a plastic case 19. The plastic case 19 is preferably formed of glass filled diallpthyllate. It is mounted on a sheet of glass 21 by an adhesive layer of polyurethane foam 22, approximately 1/16 of an inch thick.

The laminate 17, the layer of catalyzed epoxy 18, the plastic case 19, and the polyurethane foam 22 all serve to attenuate signals outside the range of shock waves, in addition to their above noted functions. The effect of these layers is to attenuate false signals which might be generated by wind, rattle, traffic vibration, etc. They do, however, transmit signals which indicate mechanical movement of the glass and are in the spectrum of signals what result from shock waves resulting from hard knocks or breakage of the sheet of glass 21. The shock waves are transmitted to conductive material 13 and through the layer of conductive epoxy 12 to the piezoelectric material 11. The shock waves cause deformation of piezoelectric material 11, which then acts like a battery to transmit a voltage through output lead 14.

Figure 2:
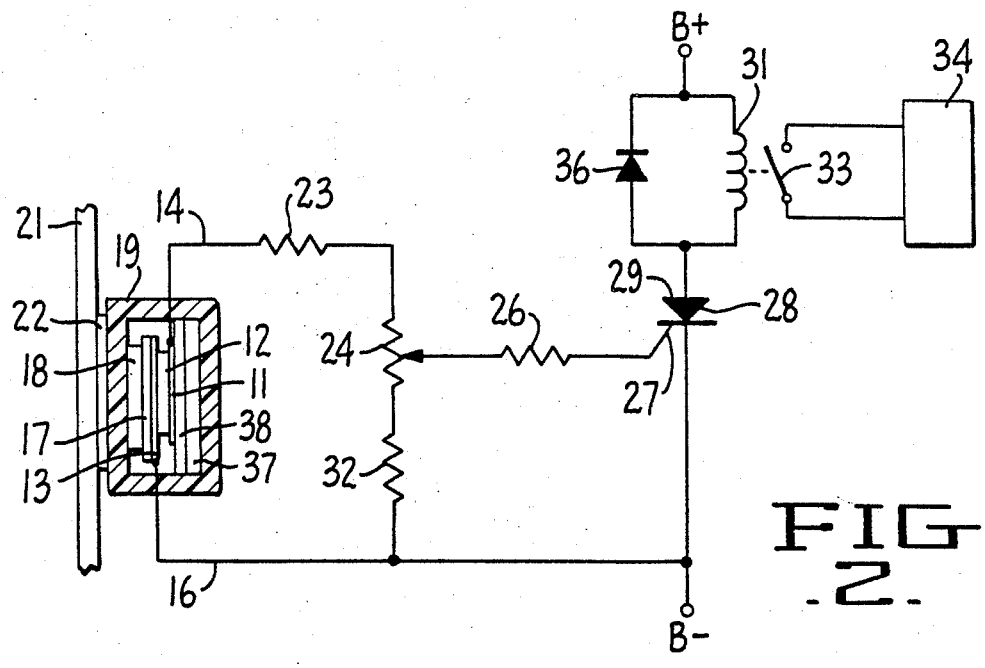
FIG. 2 is a schematic diagram of the electrical circuit of the present invention.

As shown in FIG. 2, the output signal from the piezoelectric material is transmitted through current limiting resistor 23, potentiometer 24, and current limiting resistor 26 to the gate electrode 27 of SCR 28. The anode 29 of SCR 28 is connected in series with the solenoid 31 of a standard relay which is connected to a standard voltage source B+ as shown.

The potentiometer 24 which is shown connected to another current limiting resistor 32 may be adjusted so that when the piezoelectric material 11 generates the signal indicative of the breakage of glass, an electrical signal is applied via the current limiting resistor 26 to the gate electrode 27 to exceed the threshold of the SCR. The SCR thereby becomes conductive and transmits current through the solenoid 31 to thereby activate an associated armature 33 to energize any standard utilization device 34 to signal an alarm. If the signal from the piezoelectric material 11 does not have an amplitude which exceeds that of a shock wave, the setting of the potentiometer 24 attenuates the signal so that the voltage applied to control electrode 27 does not exceed its threshold level. In this manner, signals which are not indicative of the breakage of glass do not cause false alarms. Diode 36 is connected in parallel with solenoid 31 to suppress transient signals.

A layer of polyurethane foam 38 is formed of the layers of material as shown in FIG. 1 to shield them from foreign material. The layer also filters out signals outside the range of shock waves. The laminate is covered with epoxy 37 for additional environmental protection.

Thus it is seen that the piezoelectric material in the present invention is capable of generating an alarm in response to shock waves from the breakage of glass. Additional layers of material are formed in juxtaposition with the piezoelectric material to attenuate signals outside the range of shock waves to thereby avoid false alarms. The plastic case completely encapsulates the piezoelectric material and the layers of material adjacent thereto to provide environmental protection.

Obviously, many modifications and variations of the present invention are possible in the light of the above teachings. For example, the layers of material could be formed in any desired arrangement to transmit shock waves to the piezoelectric material to attenuate waves outside the range of shock waves. Furthermore, any or all of the electric circuitry may be inserted inside the plastic case. It is therefore to be understood that within the scope of the appended claims, the invention may be practiced, otherwise than as specifically described.

I claim:

1. In an alarm for sensing vibrations in a sheet of glass capable of breaking the glass, a vibration sensor comprising
    a piezoelectric element responsive to vibrations to generate an output signal,
    means for mounting said sensor directly on and adhered to the sheet of glass,
    mechanical filtration means interposed between said piezoelectric element and the sheet of glass for blocking from said piezoelectric element vibrations of a frequency and magnitude incapable of breaking the glass,
    and electrical circuit means coupled to said piezoelectric element for generating an alarm signal in response to an output signal from said piezoelectric element,
    said electrical circuit means being responsive to said output signal only when the latter reaches a voltage corresponding to mechanical vibration of the sheet of glass of a frequency and magnitude capable of breaking the glass.

2. A vibration sensor as described in claim 1 and wherein said piezoelectric element comprises a flat layer of piezoelectric ceramic bonded by a layer of electrically conductive epoxy to a sheet of copper.

3. A vibration sensor as described in claim 2 and wherein said mechanical filtration means comprises enclosing said piezoelectric element in an imperforate plastic housing, a layer of epoxy glass laminate bonded to said sheet of copper and to the interior of said housing, and a layer of polyurethane foam adhered to the exterior of said housing for bonding to the glass.

4. A vibration sensor as described in claim 1 and wherein said electrical circuit means comprises a potentiometer for adjusting the voltage of said output signal to a value low enough to preclude false alarms from vibrations of insufficient magnitude to break the glass.

5. A vibration sensor as described in claim 4 and wherein said electrical circuit further comprises an SCR having a control electrode connected to said potentiometer to thereby render said SCR conductive in response to vibrations capable of breaking the glass, and a relay circuit having a solenoid coupled to the anode of the SCR for generating an alarm signal when said SCR is in the conductive state.

* * * * *